United States Patent [19]

Wallace et al.

[11] Patent Number: 5,071,815
[45] Date of Patent: Dec. 10, 1991

[54] METHOD FOR PRODUCING CATALYSTS

[75] Inventors: John B. Wallace, Richmond; Klaus H. Oehr, Surrey, both of Canada

[73] Assignee: British Columbia Research Corporation, Vancouver, Canada

[21] Appl. No.: 634,285

[22] Filed: Dec. 26, 1990

Related U.S. Application Data

[63] Continuation-in-part of Ser. No. 402,151, Sep. 1, 1989, abandoned.

[51] Int. Cl.$^5$ ............... B01J 23/02; B01J 23/10; B01J 21/06; B01J 21/10
[52] U.S. Cl. .................... 502/302; 502/340; 502/344
[58] Field of Search ............ 502/3, 302, 340, 344

[56] References Cited

U.S. PATENT DOCUMENTS 3,784,485  1/1974  Tomezsko ............ 502/344
3,812,171  5/1974  Neikam et al. ........ 502/3 X Primary Examiner—W. J. Shine
Attorney, Agent, or Firm—Townsend and Townsend

[57] ABSTRACT

A method of forming a metal oxide crystal structure having a peroxide defect and doped with an alkali metal or alkaline earth metal. The method involves growing the doped metal oxide crystal by thermally decomposing in an oxidizing atmosphere a liquid mixture of an alkali metal salt or alkaline earth metal salt and the metal oxide or a compound that can decompose to form the metal oxide under the thermal decomposition conditions.

13 Claims, No Drawings

METHOD FOR PRODUCING CATALYSTS

CROSS-REFERENCE TO RELATED APPLICATION

This application is a continuation-in-part of U.S. application Ser. No. 402,151 filed Sept. 1, 1989, now abandoned, the disclosure of which is incorporated herein by reference.

FIELD OF THE INVENTION

This invention relates to a method of producing a catalyst. More particularly, to a method of introducing an alkali metal or alkaline earth metal into a metal oxide crystal structure to provide structures that are catalytically useful, particularly in the conversion of methane to ethane and ethylene.

DESCRIPTION OF THE PRIOR ART

It is known that the direct conversion of methane to ethane is feasible. When methane and oxygen mixtures pass over a variety of metal oxide catalysts they react to form methyl free radicals which combine to form ethane. Ethyl and methyl free radicals can then be made to form from ethane to produce propane or butane. Subsequently ethane, propane or butane can crack to form ethylene, propylene or butylene.

However, the prior art does not show a commercially viable method of converting methane to ethane and ethylene. This is believed to be due to a number of problems. For example, the mechanism and thermodynamics of methane to methyl free radical formation is not clearly understood. It can be difficult to choose the appropriate catalytic support which must not become acidic at elevated temperatures. Optimum catalyst crystallography and how this crystallography effects the behaviour of alkaline catalyst dopants is not properly understood. The techniques for incorporating doping agents into the catalyst crystal structure is relatively undeveloped.

Certain metal oxides, particularly those with cubic crystal structures, have the ability to form high concentrations of peroxide defects in their crystal structures, that is these compounds are essentially non-stoichiometric with respect to oxygen; they possess an excess of oxygen. For example, samarium oxide and zirconium oxide are known to contain oxygen levels in their crystals in excess of stoichiometric amounts at elevated temperatures. The true empirical formulae for these oxides are given by:

$$Sm_2O_{3+x} \text{ and } ZrO_{2+x}$$

where x represents the concentration of peroxide defects (that is excess oxygen) in the metal oxide crystal structure.

The concentration of the peroxide defects is oxygen pressure and temperature dependent.

Soon Ho Chong et al., Journal of the Korean Chemical Society, Vol. 30, No. 1, 1986, investigated the formulae of the oxides $ZrO_2$ and $Sm_2O_3$. They measured the value of x in the empirical formulas $ZrO_{2+x}$ and $SmO_{1.5+x}$ at temperatures ranging from 500° C. to 1,000° C. and oxygen pressures in the range $2 \times 10^{-1}$ atmospheres and $1 \times 10^{-5}$ atmospheres. They found that enthalpies of formation of peroxide defect in both oxides decrease with decreasing oxygen pressure and all are positive. They also found the non-stoichiometric defect is fully ionized metal base.

The general formula for a metal oxide that contains peroxide defects is given by:

$$M_pO_{q+x}$$

Where:
M is an inorganic cation,
p is the stoichiometric number of moles of the inorganic cation,
O is oxide anion
q is the stoichiometric number of moles of oxide anions, and
x is the number of oxygen atoms in excess of q (i.e. peroxide defects)

Certain metal oxide crystals, again particularly those having a cubic crystal structure and containing relatively large cations, can be doped with small alkali metal or alkaline earth metal cations. These replace the normal cation in the metal oxide crystal structure. For example, lithium, sodium and calcium which have, respectively, ionic radii of about 0.60, 0.65 and 0.99 angstrom units can replace samarium, with an ionic radius of 1.04 angstrom units, in the samarium oxide crystal structure.

These doped crystals are believed to have the following empirical formulae:

$$Sm_2O_{3+x+y}Li_y$$

$$Sm_2O_{3+x+y}Na_y$$

$$Sm_2O_{3+x+y}Ca_{y/2}$$

The general formula for a metal oxide doped with monovalent alkali metal or alkaline earth metal cations and containing peroxide defects is:

$$M_pO_{q+x+y}D_y \qquad \text{Formula A}$$

where
M, p, O, q and x are as defined above;
D is a monovalent alkali metal cation dopant, for example lithium or sodium; and
y is the number of extra peroxide defects created by the presence of the monovalent alkali dopant cation in the metal oxide crystal structure.

For divalent dopant cations, for example calcium, the general formula for doped metal oxide is given by:

$$M_pO_{q+x+y}D_{y/2}$$

For some metal oxides, for example magnesium oxide, the value of x in formula A is zero. However, with a lithium ion dopant, the magnesium oxide can be made to contain peroxide defects as shown by y in formula A.

The presence of peroxide defects in lithium-doped magnesium oxide crystals has been verified experimentally in the prior art, for example Driscoll, et al., Journal of the American Chemical Society, 107:58-63. However, the mechanism of peroxide defect formation has not been adequately described in the prior art.

The prior art describes the use of acidic catalyst supports such as silica and alumina but these can be expected to destroy the metal oxide catalysts and their peroxide defect due to the formation of silicates and aluminates respectively at elevated temperatures. In this regard see Catalysis Reviews—Science and Engineering, 28(1):53 (1986); Catalysis Today 4:433 (1989) and European patent application 86100325.9 of Otsuka et al.

The prior art teaches the alkaline doping of metal oxides to generate peroxide defects and the use of these doped metal oxides to convert methane to ethane. Lithium carbonate has been mixed with a stirred suspension of magnesium oxide in boiling water, refluxed and then distilled to remove the water under vacuum. The resulting distillation residue or cake, was heated for 8 hours at 900° C., ground and then reroasted to produce a lithium doped magnesium oxide catalyst—Koch et al. Catalysis Today 4:334 (1989). Otsuka et al. in the above European patent application described the addition of oxides of alkali metals to rare earths by impregnation or kneading. Korf et al. in Catalysts Today 4:280 (1989) described the preparation of alkali doped samarium oxide catalysts by contacting solid samarium oxide with an aqueous solution of lithium, sodium or calcium nitrate followed by drying at 140° C. and then heating for 6 hours in air at 850° C.

Thus, prior art processes for producing maximum peroxide defects in metal oxides to produce catalysts particularly useful for methane conversion suffer from a number of disadvantages. First, in many of the prior art processes a solid catalyst dopant, for example an alkaline carbonate salt, is mixed with a solid metal oxide in a technique known as dry impregnation. The mixing is achieved by kneading or physical massaging and grinding of the salt with the metal oxide. However, this effort can only achieve slight penetration of the dopant into the solid metal oxide. It is believed that this method cannot produce complete penetration of the metal oxide crystal structure by the desired dopant. Therefore, the number of possible peroxide defects in the metal oxide crystal is severely restricted by the degree of physical grinding of the metal oxide and dopant. These techniques also produce large amounts of fine, dusty material which would be unsuitable for commercial application. Very small particles would cause severe pressure drop problems in packed bed reactors and excessive catalyst losses in fluidized bed reactors. Undoped sections of the metal oxide, especially rare earth oxides, would be essentially wasted due to their low activity resulting in excessive catalyst cost.

Secondly, by mixing an aqueous catalyst dopant, such as an alkaline nitrate salt, with a solid metal oxide (wet impregnation) followed by heating to remove moisture and the dopant anion, for example nitrate, metal oxide impregnation is only slightly improved from the dry impregnation. For example, samarium oxide, which is insoluble in water, cannot be penetrated by an aqueous salt-containing solution much below its surface unless it contains numerous open cavities. During water removal the alkaline dopant salt will essentially remain on the metal oxide surface until it becomes anhydrous or decomposes. Clearly, this wet impregnation method cannot cause complete penetration of the metal oxide crystal structure by the dopant. As in dry impregnation, the possible number of peroxide defects in the metal oxide crystal is severely restricted by the degree of penetration of the metal oxide crystal structure by the dopant liquid. Again, undoped sections of the metal oxide, especially rare earth oxide, would be essentially wasted due to their low activity. Again, the result is excessive catalyst cost.

The present inventors believe that the peroxide defects can abstract hydrogen atoms from methane molecules to form methyl free radicals which combine to form ethane according to the following exemplified scheme using lithium doped samarium oxide:

$$Sm_2O_{3+x+y}Li_y + (x+y)CH_4 \rightarrow Sm_2O_{3+x+y}H_{x+y}Li_y + (x+y)CH_3 \qquad (1)$$

$$(x+y)CH_3 \rightarrow (x+y)/2 \, C_2H_6 \qquad (2)$$

It is also postulated that oxygen reacts with the abstracted hydrogen to form water and the peroxide defect is regenerated according to the following scheme, again using lithium doped samarium oxide as an example:

$$Sm_2O_{3+x+y}H_{x+y}Li_y + (x+y)/2 \, O_2 \rightarrow Sm_2O_{3+x+y}Li_y + (x+y)/2 \, H_2O \qquad (3)$$

It is believed that the lack of success in the prior art in developing catalysts suitable for commercial production of higher alkanes and alkenes, for example ethane and ethylene, from methane can be attributed to lack of understanding of the chemical and physical structure of the doped catalysts.

SUMMARY OF THE INVENTION

The present invention seeks to provide a method for introducing an alkali metal or alkaline earth metal into a metal oxide crystal structure to produce useful catalytic compounds. The method of the invention produces catalysts having the maximum possible number of peroxide defects making them particularly suitable for conversion of methane and other hydrocarbons.

Accordingly, the present invention is a method of forming metal oxide crystal structure having a peroxide defect and doped with an alkali metal or alkaline earth metal that comprises growing the doped metal oxide crystal by thermally decomposing in an oxidising atmosphere a liquid mixture of an alkali metal salt or alkaline earth metal salt and the metal oxide or a compound that can decompose to form the metal oxide under the thermal decomposition conditions.

In a preferred aspect the metal oxide has a cubic crystal structure. In a further preferred aspect the metal oxide forms a cation of large ionic radius, for example a rare earth.

In one aspect the crystal may be grown in the presence of a support. Supports should be basic or neutral, that is they should not be acidic and should not convert to an acidic structure at higher temperatures as acidic structures destroy the crystal lattice. A preferred substrate is magnesium oxide but compounds such as zirconium oxide and titanium dioxide are also appropriate. Similarly, the hydrated forms of these compounds may also be used.

Preferred alkali metals are lithium, sodium and potassium. A preferred alkaline earth metal is calcium.

The invention is illustrated, merely by way of example, in the following examples:

EXAMPLE 1

This example shows formation of a lithium doped samarium oxide catalyst on a magnesium oxide substrate.

Magnesium oxide particles were first prepared by wetting magnesium oxide or by precipitating magnesium hydroxide in a chemical reaction. Magnesium hydroxide was coated with a mixture of samarium and lithium containing liquid, for example aqueous samarium and lithium nitrates. The coated magnesium hydroxide was then baked at sufficient temperature to remove the water or other solvent and to melt the remaining samarium-lithium salt mixture. The coated magnesium hydroxide was then baked at sufficient temperatures to decompose the magnesium hydroxide to magnesium oxide without decomposing the molten samarium and lithium salt mixture so that the salt mixture could flow freely over the magnesium oxide surface. The resulting samarium-lithium coated magnesium oxide particles were baked in an oxygen-containing atmosphere to convert the molten samarium-lithium coating to samarium-lithium oxide.

EXAMPLE 2

This example shows preparation of a sodium doped samarium oxide catalyst without an additional neutral or alkaline earth metal substrate.

A mixture of samarium nitrate and sodium nitrate was rendered liquid by melting and the liquid was baked to remove water. The molten liquor was baked in an oxygen containing atmosphere to effect thermal decomposition of the nitrates to form a samarium-sodium oxide.

In addition to the two preceding examples, neutral or alkaline substrates that can be used in analogous fashion to magnesium oxide or hydroxide in Example 1 include, but are not limited to, titanium dioxide, zirconium dioxide and the hydrated forms of these compounds.

The molten alkaline metal salt mixture contained in the alkali metal doped metal oxide precursors can be chosen from any combination of salts or their solutions that permit melting and thermal decomposition to the mixed metal oxide state with little or no less of melt components due to volatilization. Optionally, the thermal decomposition of the molten salt mixture might be carried out under pressure to prevent volatilization of cations prior to metal oxide crystallization.

In certain cases it might be desirable to increase the number of molten salt components to 3 or more. For example, a magnesium-lithium-samarium oxide catalyst might be produced by thermal oxidative decomposition of a molten magnesium-samarium-lithium salt mixture.

We claim:

1. A method of forming a solid metal oxide crystal structure having a peroxide defect and doped with an alkali metal or alkaline earth metal that comprises growing the doped metal oxide crystal by thermally decomposing in an oxidising atmosphere a molten mixture of an alkali metal salt or alkaline earth metal salt and the metal oxide or a compound that can decompose to form the metal oxide under the thermal decomposition conditions and cooling.

2. A method as claimed in claim 1 in which the metal oxide has a cubic crystal structure.

3. A method as claimed in claim 1 in which the metal oxide is an oxide of a rare earth.

4. A method as claimed in claim 1 in which the metal oxide forms a cation of large ionic radius.

5. A method as claimed in claim 4 in which the metal oxide is samarium oxide.

6. A method as claimed in claim 1 in which the alkali metal is lithium.

7. A method as claimed in claim 1 in which the alkali metal is sodium.

8. A method as claimed in claim 1 in which the alkali metal is potassium.

9. A method as claimed in claim 1 in which the alkaline earth metal is calcium.

10. A method as claimed in claim 1 in which the crystal is grown in the presence of a support.

11. A method as claimed in claim 10 in which the support is basic or neutral.

12. A method as claimed in claim 11 in which the support is magnesium oxide.

13. A method as claimed in claim 10 in which the support is selected from the group consisting of titanium dioxide, zirconium dioxide, and the hydrated forms of these compounds.

* * * * *